Dec. 28, 1926.

J. G. TAYLOR

PORTABLE COTTON GIN

Filed March 6, 1926

1,612,753

J. G. Taylor
INVENTOR

BY John M. Spellman
ATTORNEY

Patented Dec. 28, 1926.

1,612,753

UNITED STATES PATENT OFFICE.

JAMES G. TAYLOR, OF CLEBURNE, TEXAS.

PORTABLE COTTON GIN.

Application filed March 6, 1926. Serial No. 92,886.

My invention refers to cotton gins, having more particular reference to a cotton gin which will enable a farmer to gin his own cotton, and thereby eliminating the necessity of hauling the cotton to a distant cotton gin. The transporting of the cotton and the time consumed in waiting for the cotton to be ginned are thus obviated, resulting in a saving to the farmer.

My invention also enables the farmer or person operating and owning one of the improved cotton gins to convey the gin from field to field and gin the cotton of neighbors or farmers in a community and resulting in a profit to both the farmer and the owner and operator of the gin.

So far as I am aware, a cotton gin of this kind has never been constructed and arranged to be moved about the farm premises or to nearby places in the ginning and baling of cotton, and while no claim is made of course for the gin parts, the manner of compactly building and constructing the gin in this form is novel and practicable.

For a more full understanding of the improved cotton gin and the mode of carrying out the construction and operation thereof, reference is had to the drawings accompanying this description and wherein—

Figure 1:
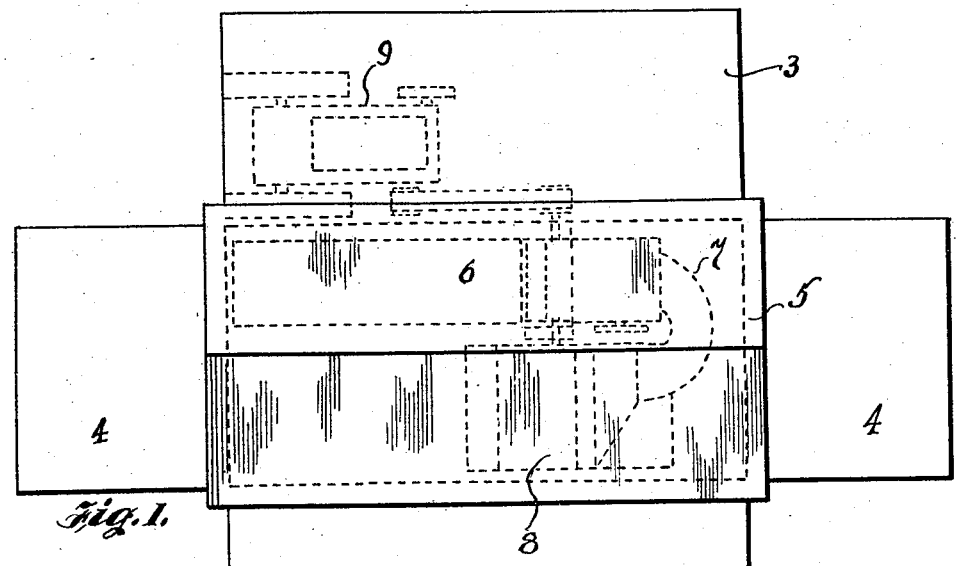
Figure 1 is a top plan view of a portable cotton gin.
Figure 2:
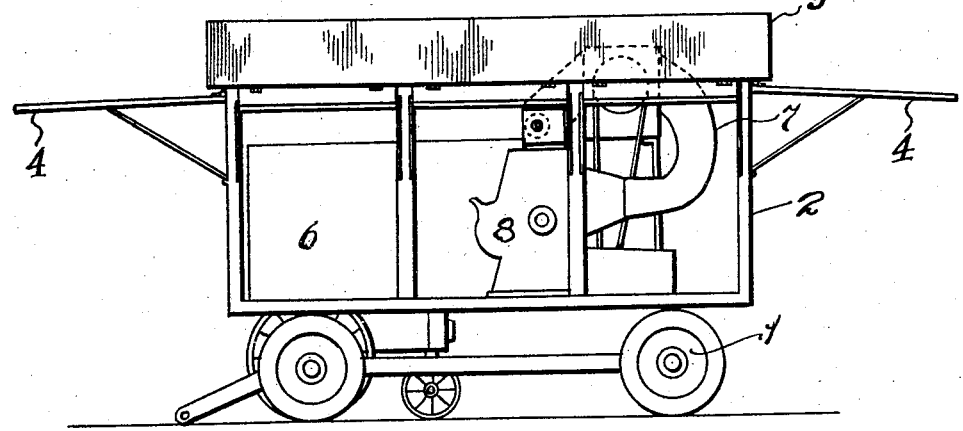
Figure 2 is a side elevational view part removed.
Figure 3:
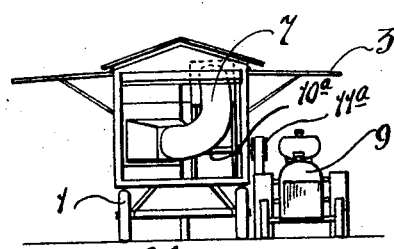
Figure 3 is an end view of reduced size.

Referring more particularly to the drawings, 1 denotes a motor vehicle truck upon which is supported a frame 2. The truck or supporting medium for the frame may be of any suitable form and the frame likewise arranged, the primary object, as is obvious, being to place the gin parts in as small a space as possible. The preferred form of body included in the frame has its sides 3 and ends 4 hingedly supported to the body and may be extended outwardly from the body as illustrated in the drawings in Figures 1 and 2, and serve as a shed or protection against the weather. The top 5 is sloped in the ordinary manner to provide a roof.

In the interior of the body or housing are disposed the ordinary cotton press 6, connected by the lint flue 7 to the gin 8, these parts being well known and no claim is made therefor, except in so far as the arrangement and method of disposing them in the housing is concerned.

The primary object of the invention being to provide a cotton gin of the movable or portable type, no means are used to pick up the cotton from the wagon by the usual suction pipe, and I prefer to dump the cotton as it comes from the field directly into the feeder or hopper, and so do away with any part which is not found absolutely necessary to provide compactness and light weight.

The gin and press may be operated by an ordinary farm tractor 9 as illustrated in the drawing by means of the shaft 10$^a$ and pulley 11$^a$, or by any other means, and the tractor may be utilized to convey the gin from place to place, either on the farm premises, in the cotton field, or from farm to farm, as might be desired.

It should be understood that changes and alterations may be made in the means and arrangement for constructing the gin and parts thereof in compact and movable form such as will be within the scope and meaning of the appended claims.

I claim:

1. The combination of a wheeled housing with a cotton gin mounted in one side of the housing at an intermediate part of said housing, a horizontally positioned cotton press mounted in the opposite side of the housing at one end and an intermediate part of said housing, and a flue mounted in the other end of the housing and leading from the discharge side of the gin to the feed end of the press.

2. The combination of a wheeled housing including hinged sides and ends to be opened upwardly, with a cotton gin mounted in one side of the housing at an intermediate part of said housing, a horizontally positioned cotton press mounted in the opposite side of the housing at one end and an intermediate part of said housing, and a flue mounted in the other end of the housing and leading from the discharge side of the gin to the feed end of the press.

In testimony whereof I affix my signature.

JAMES G. TAYLOR.